(12) United States Patent
Iba et al.

(10) Patent No.: US 12,420,792 B2
(45) Date of Patent: Sep. 23, 2025

(54) VEHICLE CONTROL APPARATUS, VEHICLE CONTROL METHOD, AND ADAPTIVE CRUISE CONTROL SYSTEM

(71) Applicant: Hitachi Astemo, Ltd., Hitachinaka (JP)

(72) Inventors: Tatsuya Iba, Hitachinaka (JP); Kentaro Ueno, Hitachinaka (JP); Hiroshi Ito, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 336 days.

(21) Appl. No.: 17/794,717

(22) PCT Filed: Jan. 21, 2021

(86) PCT No.: PCT/JP2021/002054
§ 371 (c)(1),
(2) Date: Jul. 22, 2022

(87) PCT Pub. No.: WO2021/149768
PCT Pub. Date: Jul. 29, 2021

(65) Prior Publication Data
US 2023/0073287 A1    Mar. 9, 2023

(30) Foreign Application Priority Data
Jan. 23, 2020   (JP) ................................. 2020-009097

(51) Int. Cl.
*B60W 30/165* (2020.01)
*B60W 10/18* (2012.01)
*B60W 40/072* (2012.01)

(52) U.S. Cl.
CPC .......... *B60W 30/165* (2013.01); *B60W 10/18* (2013.01); *B60W 40/072* (2013.01); *B60W 2520/14* (2013.01); *B60W 2720/106* (2013.01)

(58) Field of Classification Search
CPC .............................. G05D 1/0293; G08G 1/22
See application file for complete search history.

(56) References Cited

U.S. PATENT DOCUMENTS

2005/0269876 A1* 12/2005 Higuchi .................... B60T 7/12
303/155
2006/0015239 A1* 1/2006 Higuchi ................ B60T 8/1755
701/72

(Continued)

FOREIGN PATENT DOCUMENTS

DE   102006039121 A1 * 10/2007 ............ B60T 17/221
JP         2003016593 A * 1/2003 ............. G08G 1/167

(Continued)

OTHER PUBLICATIONS

Machine translation of JP-2003016593-A (Year: 2003).*

(Continued)

*Primary Examiner* — Navid Z. Mehdizadeh
*Assistant Examiner* — Caitlin R McCleary
(74) *Attorney, Agent, or Firm* — Crowell & Moring LLP

(57) ABSTRACT

A lead vehicle (1) in an adaptive cruise control system that non-mechanically connects a following vehicle (2) to the lead vehicle (1) sequentially and that causes the following vehicle (2) to follow its immediately preceding vehicle calculates vehicle velocity limit ($V1_{max}$) for limiting a velocity of the lead vehicle (1) based on maximum allowable vehicle velocity ($V2_{max}$) of the following vehicle (2), maximum allowable vehicle velocity ($V2_{max}$) satisfying a turning performance of the following vehicle (2), and controls a brake apparatus and a drive apparatus such that the velocity of the lead vehicle (1) will not exceed vehicle velocity limit ($V1_{max}$).

7 Claims, 14 Drawing Sheets

(56) References Cited

U.S. PATENT DOCUMENTS

| | | | |
|---|---|---|---|
| 2009/0005945 A1* | 1/2009 | Takeda | B60W 30/18145 |
| | | | 701/70 |
| 2013/0041567 A1 | 2/2013 | Yamashiro | |
| 2017/0168503 A1* | 6/2017 | Amla | B60W 30/00 |
| 2019/0054920 A1* | 2/2019 | Karlsson | B60W 30/18145 |
| 2020/0094830 A1 | 3/2020 | Ito et al. | |
| 2020/0180617 A1* | 6/2020 | Tezuka | B60W 30/14 |
| 2020/0207368 A1* | 7/2020 | Takagi | G05D 1/0223 |
| 2021/0041882 A1* | 2/2021 | Lacaze | B62D 6/003 |

FOREIGN PATENT DOCUMENTS

| | | |
|---|---|---|
| JP | 2009-56964 A | 3/2009 |
| JP | 2010-30525 A | 2/2010 |
| JP | 2015-20502 A | 2/2015 |
| WO | WO 2018/230286 A1 | 12/2018 |

OTHER PUBLICATIONS

Machine translation of DE-102006039121-A1 (Year: 2007).*
Extended European Search Report issued in European Application No. 21743655.9 dated Jun. 21, 2023 (9 pages).
International Search Report (PCT/ISA/210) issued in PCT Application No. PCT/JP2021/002054 dated Apr. 13, 2021 with English translation (four (4) pages).
Japanese-language Written Opinion (PCT/ISA/237) issued in PCT Application No. PCT/JP2021/002054 dated Apr. 13, 2021 (four (4) pages).
International Preliminary Report on Patentability (PCT/IB/338 & PCT/IB/373) issued in PCT Application No. PCT/JP2021/002054 dated Aug. 4, 2022, including English translation of document C2 (Japanese-language Written Opinion (PCT/ISA/237) filed on Jul. 22, 2022) (12 pages).

* cited by examiner

VEHICLE CONTROL APPARATUS, VEHICLE CONTROL METHOD, AND ADAPTIVE CRUISE CONTROL SYSTEM

TECHNICAL FIELD

The present invention relates to a vehicle control apparatus, to a vehicle control method, and to an adaptive cruise control system. In particular, it relates to adaptive cruise control that non-mechanically connects following vehicles to a lead vehicle sequentially and causes each of the following vehicles to follow its immediately preceding vehicle.

BACKGROUND ART

Adaptive cruise control has been known. In this adaptive cruise control, a vehicle controls its driving and braking forces to follow its immediately preceding vehicle that is running in the same lane in accordance with a set velocity (see Patent Document 1, for example). In the adaptive cruise control, if it is determined that the vehicle is the lead vehicle of a convoy, the vehicle changes its set velocity to a first upper limit. If it is determined that the vehicle is not the lead vehicle, the vehicle changes its set velocity to a second upper limit greater than the first upper limit.

REFERENCE DOCUMENT LIST

Patent Document

Patent Document 1: JP2015-020502A

SUMMARY OF THE INVENTION

Problem to be Solved by the Invention

There is a situation in which a lead vehicle is on a straight path and a following vehicle that is controlled to follow this lead vehicle is on a curve. In this situation, if the lead vehicle accelerates, the lateral acceleration of the following vehicle may excessively increase. This lateral acceleration occurs in a direction orthogonal to the driving direction of the following vehicle. While conventional adaptive cruise control limits the velocity of the lead vehicle such that the following vehicle can follow the lead vehicle, conventional adaptive cruise control does not take into consideration the lateral acceleration that occurs in the following vehicle. Thus, the following vehicle may, for example, experience deteriorated ride quality, slipping, or freight collapsing.

The present invention has been made to solve the above problems, and it is an object of the present invention to provide a vehicle control apparatus, a vehicle control method, and an adaptive cruise control system that prevent excessively large lateral acceleration that adaptive cruise control may cause in a following vehicle on a curve.

Means for Solving the Problem

A vehicle control apparatus according to the present invention includes a control unit which is mounted on a lead vehicle in an adaptive cruise control system that non-mechanically connects a following vehicle to the lead vehicle sequentially and that causes the following vehicle to follow its immediately preceding vehicle and which outputs a calculation result obtained based on input information to a brake apparatus or a drive apparatus as a control command, wherein the control unit calculates a vehicle velocity limit for limiting a velocity of the lead vehicle based on a maximum allowable vehicle velocity of the following vehicle, the maximum allowable vehicle velocity satisfying a turning performance of the following vehicle, and wherein the control unit outputs the control command to the brake apparatus and/or the drive apparatus such that the velocity of the lead vehicle will not exceed the vehicle velocity limit.

In addition, in a vehicle control method according to the present invention, a lead vehicle in an adaptive cruise control system that non-mechanically connects a following vehicle to the lead vehicle sequentially and that causes the following vehicle to follow its immediately preceding vehicle calculates a vehicle velocity limit for limiting a velocity of the lead vehicle based on a maximum allowable vehicle velocity of the following vehicle, the maximum allowable vehicle velocity satisfying a turning performance of the following vehicle, and controls a brake apparatus and/or a drive apparatus such that the velocity of the lead vehicle will not exceed the vehicle velocity limit.

In addition, an adaptive cruise control system according to the present invention non-mechanically connects a following vehicle to a lead vehicle sequentially and causes the following vehicle to follow its immediately preceding vehicle, wherein the lead vehicle includes: a control unit, a brake apparatus, and a drive apparatus. The control unit calculates a vehicle velocity limit for limiting a velocity of the lead vehicle based on a maximum allowable vehicle velocity of the following vehicle, the maximum allowable vehicle velocity satisfying a turning performance of the following vehicle, and outputs a control command for limiting acceleration or deceleration of the lead vehicle such that the velocity of the lead vehicle will not exceed the vehicle velocity limit. The brake apparatus controls braking force based on the control command, and the drive apparatus controls driving force based on the control command.

Effects of the Invention

The vehicle control apparatus, the vehicle control method, and the adaptive cruise control system according to the present invention can prevent excessively large lateral acceleration that adaptive cruise control may cause in a following vehicle on a curve.

MODE FOR CARRYING OUT THE INVENTION

Hereinafter, examples of the present invention will be described in detail with reference to the accompanying drawings.

First Example

Outline of Adaptive Cruise Control System

An outline of an adaptive cruise control system according to a first example will be described with reference to FIGS. 1 to 3. In this adaptive cruise control system, at least one following vehicle is non-mechanically connected to a lead vehicle sequentially, and each of the following vehicles follows its immediately preceding vehicle. The vehicles in the present description are automobiles that run on roads.

Figure 1:
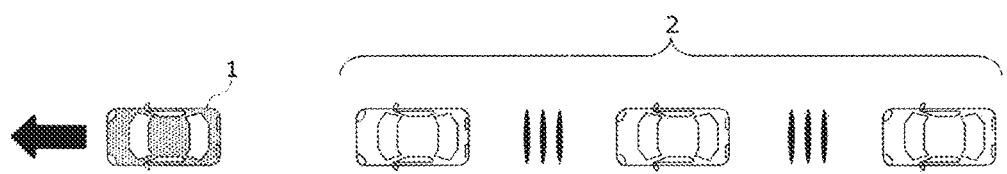
FIG. 1 is a schematic diagram illustrating a convoy in an adaptive cruise control system according to a first example.

FIG. 1 illustrates a convoy formed by a plurality of vehicles in an adaptive cruise control system. The convoy in FIG. 1 includes a lead vehicle 1 that leads the convoy and a plurality of following vehicles 2 that run after lead vehicle 1. Each following vehicle 2 follows its immediately preceding vehicle while maintaining a certain inter-vehicle distance from the immediately preceding vehicle.

Figure 2:
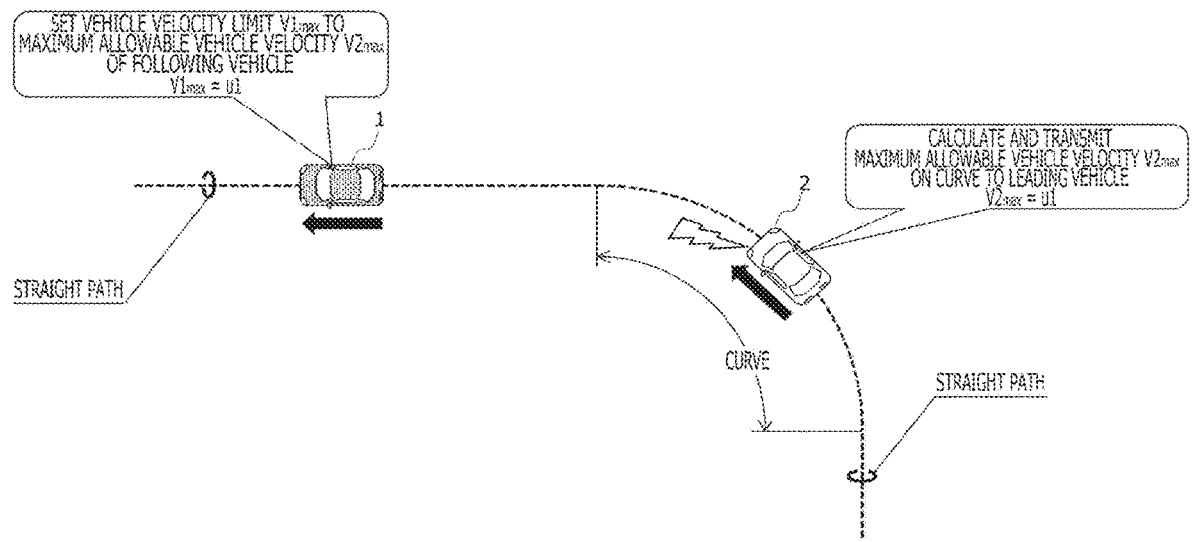
FIG. 2 is a schematic diagram illustrating an example of the driving state of a convoy including a single following vehicle.

FIG. 2 illustrates an example of the driving state of a convoy including only one following vehicle in the adaptive cruise control system. In FIG. 2, lead vehicle 1 is on a straight path after passing through a curve, and following vehicle 2 is on the curve.

A turning performance unique to following vehicle 2 is previously set in following vehicle 2, to prevent at least one of deteriorated ride quality, slipping, and freight collapsing. The turning performance of following vehicle 2 is set based on the upper limit of a lateral acceleration (lateral acceleration limit) $a_{ylim}$ or the upper limit of a yaw rate (yaw rate limit) $r_{lim}$. To satisfy this turning performance, for the velocity of the following vehicle 2, an upper limit (maximum allowable vehicle velocity) $V2_{max}$ is set based on the driving path on which following vehicle 2 runs. Maximum allowable vehicle velocity $V2_{max}$ of following vehicle 2 is the velocity of following vehicle 2 when an actual lateral acceleration $a_y$ reaches lateral acceleration limit $a_{ylim}$. Alternatively, maximum allowable vehicle velocity $V2_{max}$ of following vehicle 2 is the velocity of following vehicle 2 when an actual yaw rate r reaches yaw rate limit $r_{lim}$ of following vehicle 2.

When following vehicle 2 is on a driving path having a relatively large curvature, the actual lateral acceleration and the actual yaw rate increase more easily as the vehicle velocity of following vehicle 2 increases than those when following vehicle 2 is on a driving path having a relatively small curvature. Thus, when following vehicle 2 is on a driving path having a relatively large curvature, the actual lateral acceleration and the actual yaw rate of following vehicle 2 reach lateral acceleration limit $a_{ylim}$ and yaw rate limit $r_{lim}$ at a relatively low vehicle velocity. Thus, maximum allowable vehicle velocity $V2_{max}$ of following vehicle 2 on a driving path having a relatively large curvature is less than maximum allowable vehicle velocity $V2_{max}$ of following vehicle 2, which is on a driving path that has a relatively small curvature (including a straight path).

Referring back to FIG. 2, if lead vehicle 1 accelerates on a straight path after passing through the curve, the velocity (turning velocity) of following vehicle 2 following lead vehicle 1 also increases while maintaining a certain inter-vehicle distance therefrom on the curve. If the velocity of following vehicle 2 exceeds its maximum allowable vehicle velocity $V2_{max}$ on the curve, the actual lateral acceleration or the actual yaw rate of following vehicle 2 exceeds its upper limit $a_{ylim}$ or $r_{lim}$ used to set the turning performance, possibly resulting in deteriorated ride quality, slipping, or freight collapsing.

Thus, following vehicle 2 calculates its maximum allowable velocity $V2_{max}$ (=u1) that satisfies its turning performance at its driving location and transmits information about maximum allowable velocity $V2_{max}$ (=u1) to lead vehicle 1 via inter-vehicle communication. Next, lead vehicle 1 sets a vehicle velocity limit $V1_{max}$ for controlling its vehicle velocity to the same value as maximum allowable velocity $V2_{max}$ (=u1) and performs vehicle velocity control such that the vehicle velocity will not exceed vehicle velocity limit $V1_{max}$. In this way, the velocity of following vehicle 2 does not exceed maximum allowable vehicle velocity $V2_{max}$, and the actual lateral acceleration and the actual yaw rate of following vehicle 2 are maintained at or below their respective upper limits $a_{ylim}$ and $r_{lim}$ used to set the turning performance.

Figure 3:
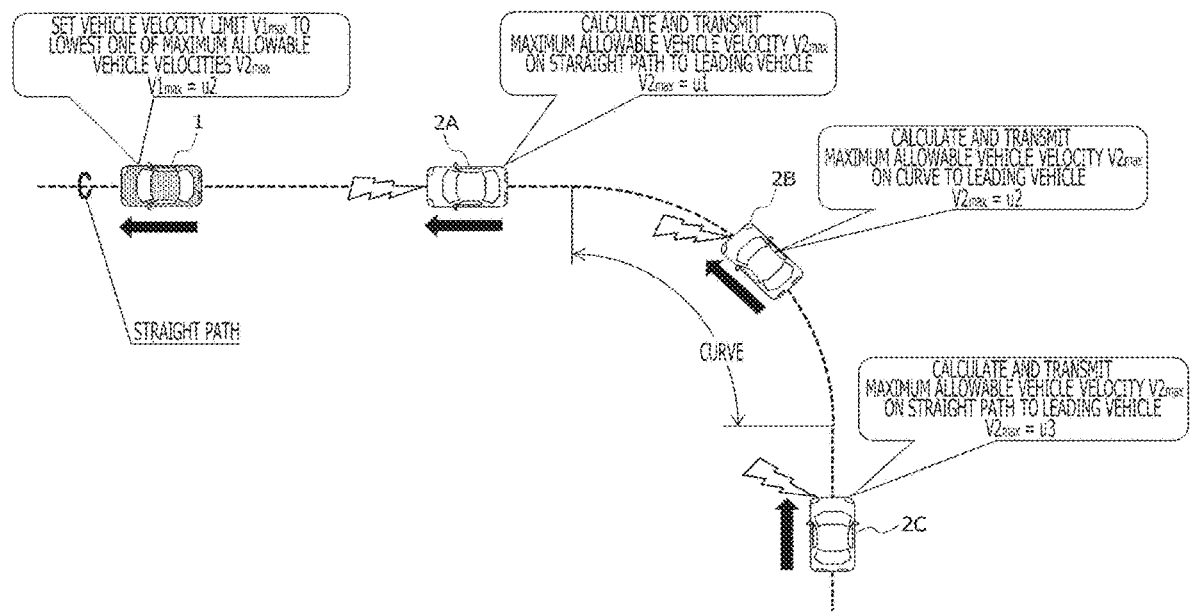
FIG. 3 is a schematic diagram illustrating an example of the driving state of a convoy including a plurality of following vehicles.

FIG. 3 illustrates an example of the driving state of a convoy including three following vehicles in the adaptive cruise control system. In FIG. 3, lead vehicle 1 and a first following vehicle 2A following lead vehicle 1 are on a straight path after passing through a curve. A second following vehicle 2B following first following vehicle 2A is on the curve, and a third following vehicle 2C following second following vehicle 2B is on a straight path before entering the curve.

As in the case of the above convoy including only one following vehicle, each of following vehicles 2A to 2C calculates its maximum allowable vehicle velocity $V2_{max}$ based on its turning performance at its driving location and transmits information about maximum allowable vehicle velocity $V2_{max}$ to lead vehicle 1 via inter-vehicle communication. Specifically, first following vehicle 2A calculates its maximum allowable vehicle velocity $V2_{max}$ (=u1) on the straight path on which first following vehicle 2A is running and transmits information about maximum allowable vehicle velocity $V2_{max}$ (=u1) to lead vehicle 1. Second following vehicle 2B calculates its maximum allowable vehicle velocity $V2_{max}$ (=u2) on the curve on which second following vehicle 2B is running and transmits information about maximum allowable vehicle velocity $V2_{max}$ (=u2) to lead vehicle 1. Third following vehicle 2C calculates its maximum allowable vehicle velocity $V2_{max}$ (=u3) on the straight path on which second following vehicle 2C is running and transmits information about maximum allowable vehicle velocity $V2_{max}$ (=u3) to lead vehicle 1.

Lead vehicle 1 sets the lowest one of maximum allowable vehicle velocities $V2_{max}$ of following vehicles 2A to 2C as vehicle velocity limit $V1_{max}$. If following vehicles 2A to 2C have the same turning performance, maximum allowable vehicle velocity $V2_{max}$ (=u2) of second following vehicle 2B running on the curve is the lowest. Thus, lead vehicle 1 sets maximum allowable vehicle velocity $V2_{max}$ (=u2) of second following vehicle 2B as vehicle velocity limit $V1_{max}$ and performs vehicle velocity control such that the vehicle velocity of lead vehicle 1 will not exceed vehicle velocity limit $V1_{max}$ set as described above. In this way, the velocities of following vehicles 2A to 2C are maintained below their respective maximum allowable vehicle velocities $V2_{max}$, and the actual lateral accelerations and the actual yaw rates of following vehicles 2A to 2C are maintained at their respective upper limits $a_{ylim}$ and $r_{lim}$ or less used to set their respective turning performances. First to third following vehicles 2A to 2C may have mutually different turning performances.

In short, according to the first example, each of following vehicles 2 calculates its maximum allowable vehicle velocity $V2_{max}$ that satisfies its turning performance at its driving location, and lead vehicle 1 performs vehicle velocity control so that its vehicle velocity will not exceed vehicle velocity limit $V1_{max}$ set based on maximum allowable vehicle velocities $V2_{max}$ of following vehicles 2.

Adaptive Cruise Control System of Following Vehicle

Figure 4:
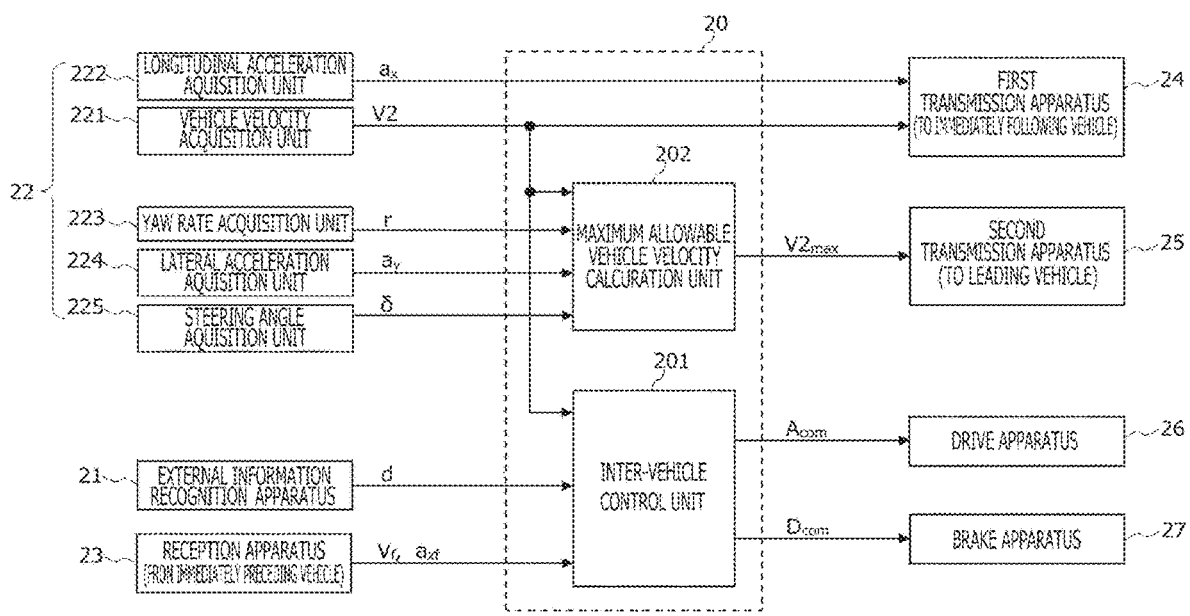
FIG. 4 is a functional block diagram illustrating an example of an adaptive cruise control system of a following vehicle.

FIG. 4 illustrates an example of an adaptive cruise control system mounted on a following vehicle. The adaptive cruise control system mounted on following vehicle 2 includes a vehicle control apparatus 20 as a main component including a microcomputer as a control unit. The adaptive cruise control system also includes an external information recognition apparatus 21, a vehicle state acquisition apparatus 22, a reception apparatus 23, a first transmission apparatus 24, a second transmission apparatus 25, a drive apparatus 26, and a brake apparatus 27.

For example, external information recognition apparatus 21 recognizes objects present in front of corresponding following vehicle 2 by using a camera, a radar, a sonar, or the like. Specifically, external information recognition apparatus 21 measures an inter-vehicle distance d between corresponding following vehicle 2 and its immediately preceding vehicle and outputs information about inter-vehicle distance d.

Vehicle state acquisition apparatus 22 acquires the vehicle state of corresponding following vehicle 2 and includes a vehicle velocity acquisition unit 221, a longitudinal acceleration acquisition unit 222, a yaw rate acquisition unit 223, a lateral acceleration acquisition unit 224, and a steering angle acquisition unit 225.

Vehicle velocity acquisition unit 221 acquires a vehicle velocity V2 of corresponding following vehicle 2 based on a vehicle velocity pulse signal output from a vehicle-mounted vehicle velocity sensor or a vehicle velocity estimation result obtained by a vehicle behavior control apparatus such as an ABS (Anti-lock Braking System) and outputs information about vehicle velocity V2. Longitudinal acceleration acquisition unit 222 acquires a longitudinal acceleration ax of corresponding following vehicle 2 by performing measurement using a vehicle-mounted longitudinal acceleration sensor and outputs information about longitudinal acceleration ax. Longitudinal acceleration acquisition unit 222 may calculate longitudinal acceleration ax based on change of vehicle velocity V2 acquired by vehicle velocity acquisition unit 221.

Yaw rate acquisition unit 223 acquires yaw rate r of corresponding following vehicle 2 by performing measurement, for example, using a vehicle-mounted yaw rate sensor and outputs information about yaw rate r. Yaw rate acquisition unit 223 may calculate yaw rate r by using measured values of physical amounts such as vehicle velocity V2 and a steering angle δ, without performing measurement using a yaw rate sensor. Lateral acceleration acquisition unit 224 acquires lateral acceleration $a_y$ of corresponding following vehicle 2 by performing measurement, for example, using a vehicle-mounted lateral acceleration sensor and outputs information about lateral acceleration $a_y$. Lateral acceleration acquisition unit 224 may calculate lateral acceleration $a_y$ by using measured values of physical amounts such as vehicle velocity V2 and steering angle δ, without performing measurement using a lateral acceleration sensor. Steering angle acquisition unit 225 acquires steering angle δ of corresponding following vehicle 2 by performing measurement, for example, using a vehicle-mounted steering angle sensor and outputs information about steering angle δ.

Reception apparatus 23 receives, from the immediately preceding vehicle of corresponding following vehicle 2, information about a velocity Vf of the immediately preceding vehicle (immediately preceding vehicle velocity) via inter-vehicle communication between following vehicle 2 and the immediately preceding vehicle in accordance with an instruction from vehicle control apparatus 20. If following vehicle 2 is not the last vehicle in a convoy, first transmission apparatus 24 transmits the output information of vehicle velocity acquisition unit 221 and longitudinal acceleration acquisition unit 222 to the vehicle immediately behind following vehicle 2 via inter-vehicle communication between corresponding following vehicle 2 and the vehicle immediately behind following vehicle 2 (the following vehicle) in accordance with an instruction from vehicle control apparatus 20. Second transmission apparatus 25 transmits, to lead vehicle 1, information about maximum allowable vehicle velocity $V2_{max}$ of corresponding following vehicle 2 calculated by vehicle control apparatus 20 via inter-vehicle communication between corresponding following vehicle 2 and lead vehicle 1 in accordance with an instruction from vehicle control apparatus 20.

Drive apparatus 26 includes a drive source (an engine, an electric motor, or a combination thereof) that generates driving force for wheels of corresponding following vehicle 2 and a drive controller that controls the driving force based on an acceleration command from vehicle control apparatus 20.

Brake apparatus 27 includes a brake mechanism (a friction brake, a drum brake, or the like) that applies braking force to wheels of corresponding following vehicle 2, and a brake controller that controls the braking force based on a deceleration command from vehicle control apparatus 20.

The microcomputer in vehicle control apparatus 20 includes a processor such as a central processing unit (CPU), a non-volatile memory such as a read-only memory (ROM), a volatile memory such as a random access memory (RAM), and an input-output port, which are connected to a bus. The same applies to various microcomputers, which will be described below.

The microcomputer in vehicle control apparatus 20 receives various kinds of information output from external information recognition apparatus 21, vehicle state acquisition apparatus 22, and reception apparatus 23 and outputs calculation results obtained based on various kinds of information to second transmission apparatus 25, drive apparatus 26, and brake apparatus 27. Vehicle control apparatus 20 has two main functions, which are an inter-vehicle control unit 201 that causes corresponding following vehicle 2 to follow its immediately preceding vehicle while maintaining the inter-vehicle distance between corresponding following vehicle 2 and the immediately preceding vehicle at a target value and a maximum allowable vehicle velocity calculation unit 202 that calculates maximum allowable vehicle velocity $V2_{max}$ that satisfies the turning performance of corresponding following vehicle 2 at an individual driving location.

The individual functions of vehicle control apparatus 20 are realized by causing, in the microcomputer, the processor to read out a control program from the non-volatile memory to the volatile memory and to execute the control program. Alternatively, the functions of vehicle control apparatus 20 may be entirely or partly realized by hardware components. The same applies to various vehicle control apparatuses, which will be described below.

To maintain the inter-vehicle distance between corresponding following vehicle 2 and the immediately preceding vehicle at a target value during convoy driving, inter-vehicle control unit 201 outputs an acceleration command value $A_{com}$ as an acceleration command to drive apparatus 26, and outputs a deceleration command $D_{com}$ as a deceleration command to brake apparatus 27. The target value of the inter-vehicle distance may be a constant value or a variable value. That is, the target value of the inter-vehicle distance may be changed as the driving state changes. For example, the target value of the inter-vehicle distance may be increased as the vehicle velocity increases. Inter-vehicle control unit 201 calculates acceleration command value $A_{com}$ in accordance with the following mathematical equation (1), for example.

$$A_{com} = a_{xf} + Kx \times \Delta x + Kv \times \Delta v \tag{1}$$

In mathematical equation (1), $\Delta x$ denotes the difference between inter-vehicle distance d acquired based on the output information of external information recognition apparatus 21 and a target value d* of inter-vehicle distance d ($\Delta x = d - d^*$). When inter-vehicle distance d is greater than target value d*, $\Delta x$ is calculated as a positive value. When inter-vehicle distance d is less than target value d*, $\Delta x$ is calculated as a negative value. In addition, $\Delta v$ denotes the difference between immediately preceding vehicle velocity $V_f$ acquired based on the output information of reception apparatus 23 and vehicle velocity V2 of corresponding following vehicle 2 acquired based on the output information of vehicle velocity acquisition unit 221 ($\Delta v = V_f - V2$). When the immediately preceding vehicle velocity $V_f$ is faster than vehicle velocity V2 of corresponding following vehicle 2, $\Delta v$ is calculated as a positive value. When immediately preceding vehicle velocity $V_f$ is slower than vehicle velocity V2 of corresponding following vehicle 2, $\Delta v$ is calculated as a negative value.

In mathematical equation (1), $a_{xf}$ denotes the longitudinal acceleration of the immediately preceding vehicle acquired based on the output information of reception apparatus 23. When the immediately preceding vehicle accelerates and immediately preceding vehicle velocity $V_f$ increases, $a_{xf}$ is given as a positive value. When the immediately preceding vehicle decelerates and immediately preceding vehicle velocity $V_f$ decreases, axe is given as a negative value. In addition, Kx and Kv are positive gain constants, which are control constants stored in the non-volatile memory of the microcomputer.

When acceleration command value $A_{com}$ calculated in accordance with mathematical equation (1) is a positive value, inter-vehicle control unit 201 outputs acceleration command value $A_{com}$ as an acceleration command to drive apparatus 26. In contrast, when acceleration command value $A_{com}$ calculated in accordance with mathematical equation (1) is a negative value, inter-vehicle control unit 201 calculates deceleration command $D_{com}$ as $D_{com} = |A_{com}|$ and calculated outputs deceleration command $D_{com}$ as a deceleration command to brake apparatus 27.

Other than mathematical equation (1), inter-vehicle control unit 201 may use a different mathematical equation for calculating acceleration command value $A_{com}$. For example, inter-vehicle control unit 201 may use a different mathematical equation as needed, depending on a control request. For example, inter-vehicle control unit 201 may use a mathematical equation including a derivative term or an integral term or may modify and use information about longitudinal acceleration axe or immediately preceding vehicle velocity $V_f$ of the immediately preceding vehicle. Alternatively, inter-vehicle control unit 201 may use a mathematical equation that does not use these items of information.

Maximum allowable vehicle velocity calculation unit 202 calculates maximum allowable vehicle velocity $V2_{max}$ based on lateral acceleration limit $a_{ylim}$ or yaw rate limit $r_{lim}$ used to set the turning performance of corresponding following vehicle 2 and a curvature κ2 of the driving path on which corresponding following vehicle 2 is running.

Lateral acceleration limit $a_{ylim}$ and yaw rate limit $r_{lim}$ can be stored as fixed values in the non-volatile memory of the microcomputer. Alternatively, a vehicle user may specify any values as lateral acceleration limit $a_{ylim}$ and yaw rate limit $r_{lim}$ by operating a switch or the like. For example, if lateral acceleration limit $a_{ylim}$ or yaw rate limit $r_{lim}$ is defined to prevent slip, lateral acceleration limit $a_{ylim}$ or yaw rate limit $r_{lim}$ may be set changeably depending on the road conditions of the driving path. If lateral acceleration limit $a_{ylim}$ or yaw rate limit $r_{lim}$ is defined to prevent collapsing of the freight, lateral acceleration limit $a_{ylim}$ or yaw rate limit $r_{lim}$ may be set changeably depending on the load weight or load height.

In accordance with the following mathematical equation (2), maximum allowable vehicle velocity $V2_{max}$ is calculated as the square root of a value obtained by dividing lateral acceleration limit $a_{ylim}$ by curvature κ2. Alternatively, in accordance with the following mathematical equation (3), maximum allowable vehicle velocity $V2_{max}$ may be calculated as a value obtained by dividing yaw rate limit $r_{lim}$ by curvature κ2.

$$V2_{max} = (a_{ylim}/\kappa 2)^{1/2} \tag{2}$$

$$V2_{max} = r_{lim}/\kappa 2 \tag{3}$$

Curvature κ2 of the driving path on which following vehicle 2 is running is calculated by suitably assigning physical amounts indicating the vehicle state at an actual driving location of following vehicle 2 to any one of various relational expressions indicating basic motion characteristics of following vehicle 2. Examples of the physical amounts include vehicle velocity V2, lateral acceleration $a_y$, yaw rate r, and steering angle δ of following vehicle 2. For example, if vehicle velocity V2 and lateral acceleration $a_y$ of following vehicle 2 at the driving location of following vehicle 2 have already been acquired, curvature κ2 can be calculated as a value obtained by dividing lateral acceleration $a_y$ by the square of vehicle velocity V2 ($\kappa 2 = a_y/V2^2$). If vehicle velocity V2 and yaw rate r of following vehicle 2 at the driving location of following vehicle 2 have already been acquired, curvature κ2 can be calculated as a value obtained by dividing yaw rate r by vehicle velocity V2 ($\kappa 2 = r/V2$). In addition, if vehicle velocity V2 and steering angle δ of following vehicle 2 at the driving location of following vehicle 2 have already been acquired, and a stability factor A and a wheelbase L that are constants unique to following vehicle 2 are known, curvature κ2 can be calculated in accordance with a relational expression (κ2=δ/(1+A×V2²)× L).

Maximum allowable vehicle velocity calculation unit 202 may calculate maximum allowable vehicle velocity $V2_{max}$ by using yaw rate r or lateral acceleration $a_y$ acquired at the driving location of following vehicle 2, instead of using curvature κ2 of the driving path on which following vehicle 2 is running. Specifically, maximum allowable vehicle velocity calculation unit 202 may calculate maximum allowable vehicle velocity $V2_{max}$ as a value obtained by dividing lateral acceleration limit $a_{ylim}$ by yaw rate r in accordance with the following mathematical equation (4) or as a value obtained by dividing lateral acceleration $a_y$ by yaw rate limit $r_{lim}$ in accordance with the following mathematical equation (5).

$$V2_{max}=a_{ylim}/r \quad (4)$$

$$V2_{max}=a_y/r_{lim} \quad (5)$$

Vehicle control apparatus 20 of following vehicle 2 may use a different method for calculating maximum allowable vehicle velocity $V2_{max}$ as necessary, depending on a specific configuration of vehicle state acquisition apparatus 22 of following vehicle 2. After maximum allowable vehicle velocity calculation unit 202 outputs information about maximum allowable vehicle velocity $V2_{max}$ calculated thereby from vehicle control apparatus 20 to second transmission apparatus 25, second transmission apparatus 25 transmits the information to lead vehicle 1.

Another Example of Adaptive Cruise Control System of the Following Vehicle

Figure 5:
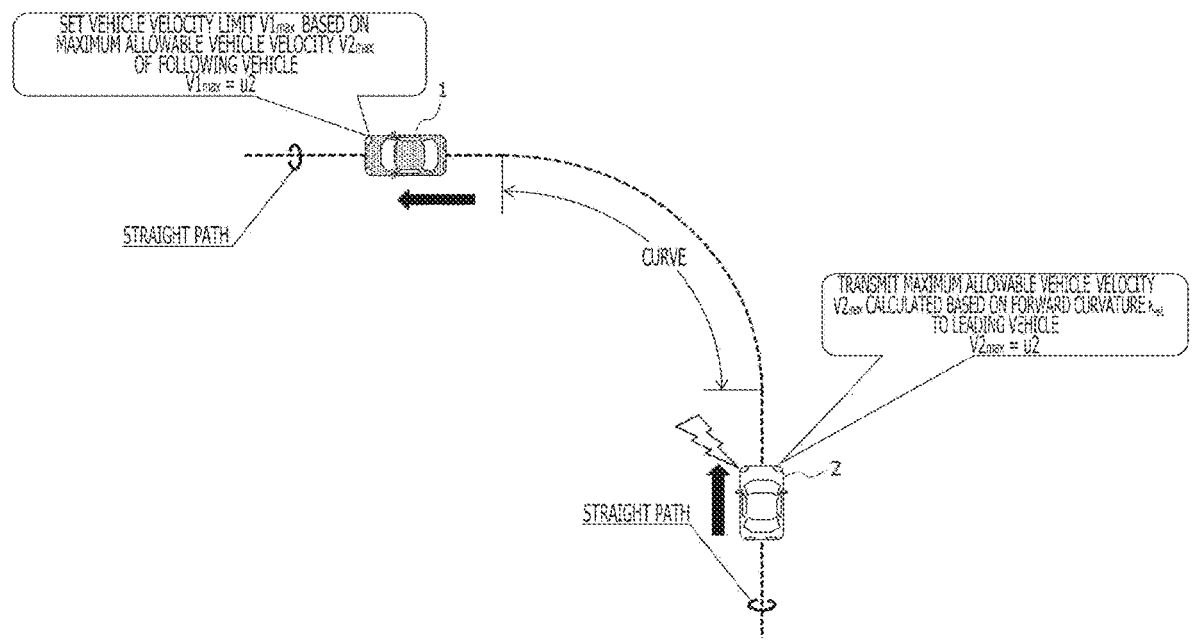
FIG. 5 is a schematic diagram illustrating another example of the adaptive cruise control system of the following vehicle.

FIG. 5 is a schematic diagram illustrating another example of the adaptive cruise control system of the following vehicle. In FIG. 5, lead vehicle 1 is on a straight path after passing through a curve, and a certain following vehicle 2 is on a straight path before entering the curve. In the above adaptive cruise control system, following vehicle 2 calculates maximum allowable vehicle velocity $V2_{max}$ that satisfies its turning performance on the straight path on which following vehicle 2 is actually running. However, in this example, as illustrated in FIG. 5, following vehicle 2 calculates its maximum allowable vehicle velocity $V2_{max}$ that satisfies its turning performance on the curve on which following vehicle 2 is about to enter. That is, following vehicle 2 calculates its maximum allowable vehicle velocity $V2_{max}$ (=u2) based on curvature (forward curvature) $κ2_{est}$ of the curve into which following vehicle 2 is about to enter and its turning performance. In addition, when lead vehicle 1 sets vehicle velocity limit $V1_{max}$, lead vehicle 1 uses maximum allowable vehicle velocity $V2_{max}$ (=u2). In this way, since lead vehicle 1 can reduce velocity limit $V1_{max}$ before following vehicle 2 enters the curve, and the lateral acceleration generated on the curve on which following vehicle 2 is about to enter is reduced more reliably.

Specifically, vehicle control apparatus 20 of following vehicle 2 calculates its maximum allowable vehicle velocity $V2_{max}$ by assigning lateral acceleration limit $a_{ylim}$ and forward curvature $κ2_{est}$ in place of curvature κ2 to mathematical equation (2) or by assigning yaw rate limit $r_{lim}$ and forward curvature $κ2_{est}$ in place of curvature κ2 to mathematical equation (3). Next, vehicle control apparatus 20 compares maximum allowable vehicle velocity $V2_{max}$ calculated based on forward curvature $κ2_{est}$ and the turning performance of following vehicle 2 with maximum allowable vehicle velocity $V2_{max}$ that satisfies the turning performance of following vehicle 2 at the driving location on which following vehicle 2 is actually running. As a result of the comparison, the vehicle control apparatus 20 transmits information about the lower one of maximum allowable vehicle velocities $V2_{max}$ to lead vehicle 1. When setting vehicle velocity limit $V1_{max}$, lead vehicle 1 uses the lower maximum allowable vehicle velocity $V2_{max}$.

Forward curvature $κ2_{est}$ can be estimated based on external information recognized by external information recognition apparatus 21. For example, if external information recognition apparatus 21 is configured to recognize road demarcation lines (white lines) by processing its camera images, forward curvature $κ2_{est}$ can be estimated from the recognized road demarcation lines. If external information recognition apparatus 21 can acquire a relative location and a relative angle, in addition to inter-vehicle distance d between corresponding following vehicle 2 and the immediately preceding vehicle thereof, by processing its camera images, forward curvature $κ2_{est}$ can be estimated based on a curve obtained by interpolation as the driving path of the immediately preceding vehicle from the acquired data. In another example, from the acquired data, a line extending in the front-back direction of corresponding following vehicle 2 and a line extending in the front-back direction of the immediately preceding vehicle on a two-dimensional plane are determined, and forward curvature $κ2_{est}$ can be estimated based on a curve that is into contact with these lines and that connects corresponding following vehicle 2 and the immediately preceding vehicle without an inflection point.

In addition, forward curvature $κ2_{est}$ can be estimated by determining the road shape of the forward driving path from map information. For example, if following vehicle 2 can acquire its vehicle location from a global positioning system (GPS), a locator, or the like, forward curvature $κ2_{est}$ can be estimated by reading out map information about the acquired vehicle location from a map information database and determining the road shape of the forward driving path.

In addition, forward curvature $κ2_{est}$ can be estimated by acquiring past records of the vehicle state of the immediately preceding vehicle. For example, reception apparatus 23 of corresponding following vehicle 2 receives physical amounts (longitudinal acceleration ax, lateral acceleration $a_y$, yaw rate r, vehicle velocity V2, etc.) relating to the vehicle state acquired by vehicle state acquisition apparatus 22 of the immediately preceding vehicle of corresponding following vehicle 2, and the driving path of the immediately preceding vehicle can be estimated by performing dead reckoning using integral values of these physical amounts. Corresponding following vehicle 2 can estimate forward curvature $κ2_{est}$ based on the estimated driving path. Alternatively, if the immediately preceding vehicle is configured to acquire and transmit its own vehicle location, corresponding following vehicle 2 can estimate the driving path from past records of the vehicle location of the immediately preceding vehicle and can estimate forward curvature $κ2_{est}$ based on this estimated driving path.

Adaptive Cruise Control System of the Lead Vehicle

Figure 6:
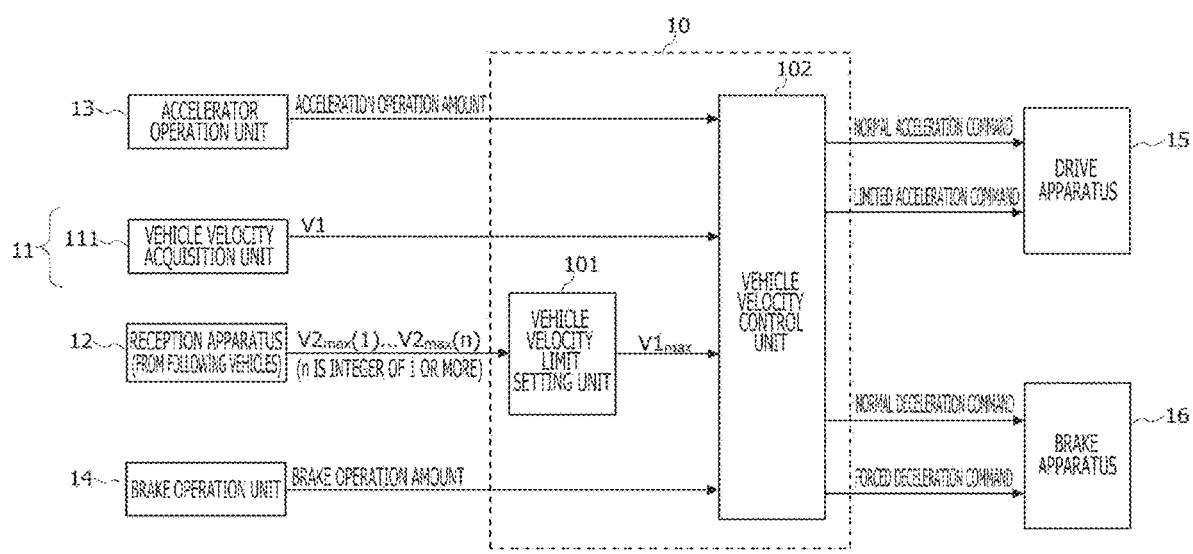
FIG. 6 is a functional block diagram illustrating an example of an adaptive cruise control system of a lead vehicle.

FIG. 6 illustrates an example of an adaptive cruise control system mounted on the lead vehicle. The adaptive cruise control system mounted on lead vehicle 1 includes a vehicle control apparatus 10 as a main component including a microcomputer as a control unit. The adaptive cruise control system also includes a vehicle state acquisition apparatus 11, a reception apparatus 12, an accelerator operation unit 13, a brake operation unit 14, a drive apparatus 15, and a brake apparatus 16. Vehicle state acquisition apparatus 11 includes a vehicle velocity acquisition unit 111. Since vehicle velocity acquisition unit 111 is configured in the same way as vehicle velocity acquisition unit 221 of following vehicle 2, description thereof will be omitted.

Reception apparatus 12 receives information about maximum allowable vehicle velocities $V2_{max}(1)$ to $V2_{max}(n)$ from following vehicles 2 via inter-vehicle communication with following vehicles 2 and outputs the information to vehicle control apparatus 10, and n is an integer (a natural number) or 1 or greater for indicating identification numbers of following vehicles 2. For example, identification numbers are allocated to following vehicles 2 following lead vehicle 1 in ascending order via inter-vehicle communication.

Accelerator operation unit 13 is a mechanism (for example, an accelerator pedal) that receives an acceleration operation amount (for example, an accelerator position) allowing the vehicle user to accelerate lead vehicle 1 and includes an acceleration operation amount sensor (not illustrated) that detects the acceleration operation amount and that outputs information about the acceleration operation amount. The acceleration operation amount is a positive value, and the vehicle velocity of lead vehicle 1 increases as the acceleration operation amount increases.

Brake operation unit 14 is a mechanism (for example, a brake pedal) that receives a brake operation amount (for example, a brake position) for allowing the vehicle user to decelerate lead vehicle 1 and includes a brake operation amount sensor (not illustrated) that detects the brake operation amount and that outputs information about the brake operation amount. The brake operation amount is a positive value, and the vehicle velocity of lead vehicle 1 decreases as the brake operation amount increases.

Drive apparatus 15 includes a drive source (an engine, an electric motor, or a combination thereof) that generates driving force for wheels of lead vehicle 1, and a drive controller that controls the driving force based on a control command from vehicle control apparatus 10. Vehicle control apparatus 10 outputs, to drive apparatus 15, a normal acceleration command or a limited acceleration command as a control command.

Brake apparatus 16 includes a brake mechanism (a friction brake, a drum brake, or the like) that applies braking force to wheels of lead vehicle 1 and a brake controller that controls the braking force based on a control command output from vehicle control apparatus 10. The vehicle control apparatus 10 outputs, to brake apparatus 16, a normal deceleration command or a forced deceleration command as a control command.

The microcomputer of vehicle control apparatus 10 receives various kinds of information output from vehicle velocity acquisition unit 111, reception apparatus 12, accelerator operation unit 13, and brake operation unit 14 and outputs calculation results obtained based on various kinds of information as control commands to drive apparatus 15 and brake apparatus 16. Vehicle control apparatus 10 has two main functions, which are a vehicle velocity limit setting unit 101 and a vehicle velocity control unit 102.

Vehicle velocity limit setting unit 101 acquires maximum allowable vehicle velocities $V2_{max}(1)$ to $V2_{max}(n)$ (n is a natural number) of following vehicles 2 from the output information of reception apparatus 12 and sets vehicle velocity limit $V1_{max}$ based on maximum allowable vehicle velocities $V2_{max}(1)$ to $V2_{max}(n)$. Specifically, if there is only one following vehicle 2, vehicle velocity limit setting unit 101 sets maximum allowable vehicle velocity $V2_{max}(1)$ as vehicle velocity limit $V1_{max}$. If there are a plurality of following vehicles 2, vehicle velocity limit setting unit 101 sets the lowest one of maximum allowable vehicle velocities $V2_{max}(1)$ to $V2_{max}(n)$ (n is a natural number of 2 or more) as vehicle velocity limit $V1_{max}$.

Vehicle velocity control unit 102 acquires vehicle velocity V1, the acceleration operation amount, and the brake operation amount from the output information of vehicle velocity acquisition unit 111, accelerator operation unit 13, and brake operation unit 14 and outputs control commands generated based on the acceleration operation amount, vehicle velocity V1, vehicle velocity limit $V1_{max}$, and the brake operation amount to drive apparatus 15 and brake apparatus 16. Vehicle velocity control unit 102 performs vehicle velocity control in this way.

Basically, vehicle velocity control unit 102 outputs a normal acceleration command generated based on an acceleration operation amount associated with an acceleration request from the vehicle user to drive apparatus 15 as a control command. However, when velocity V1 exceeds a predetermined vehicle velocity V1d less than vehicle velocity limit $V1_{max}$, vehicle velocity control unit 102 generates a limited acceleration command based on a corrected acceleration operation amount that is less than the acceleration operation amount, to limit the acceleration of lead vehicle 1. Next, vehicle velocity control unit 102 outputs this limited acceleration command to drive apparatus 15 as a control command. Specifically, if vehicle velocity V1 is between vehicle velocity limit $V1_{max}$ and predetermined vehicle velocity V1d, vehicle velocity control unit 102 reduces the acceleration operation amount to a value within a range in which lead vehicle 1 can be accelerated. Vehicle velocity control unit 102 may perform greater reduction from the acceleration operation amount to the corrected acceleration operation amount when the difference (=$V1_{max}$-V1) between vehicle velocity limit $V1_{max}$ and vehicle velocity V1 is less. If vehicle velocity V1 is over vehicle velocity limit $V1_{max}$, vehicle velocity control unit 102 reduces the acceleration operation amount to a value that does not substantially accelerate lead vehicle 1 (for example, 0).

In the case of vehicle control apparatus 10, predetermined vehicle velocity V1d may be set variably depending on the acceleration operation amount. For example, as the acceleration operation amount increases (that is, as the longitudinal acceleration increases), predetermined vehicle velocity V1d may be separated further from vehicle velocity limit $V1_{max}$. In the case of vehicle control apparatus 10, even when vehicle velocity V1 is over predetermined vehicle velocity V1d, if no acceleration operation amount is input, or if the acceleration operation amount is not a value indicating an acceleration request from the vehicle user, outputting of the limited acceleration command can be omitted.

In addition, basically, vehicle velocity control unit 102 outputs a normal deceleration command generated based on a brake operation amount associated with a brake request from the vehicle user to brake apparatus 16 as a control command. However, if vehicle velocity V1 exceeds vehicle velocity limit $V1_{max}$, vehicle velocity control unit 102 outputs the forced deceleration command as a control command to brake apparatus 16 for forcibly decelerating lead vehicle 1, so as to reduce vehicle velocity V1 to vehicle velocity limit $V1_{max}$ or less. The brake operation amount, when the forced deceleration command is output, may be set as a fixed value or a value that varies depending on the excess of vehicle velocity V1 from vehicle velocity limit $V1_{max}$.

There is a case in which the vehicle user generates a brake request while a forced deceleration command is being output. That is, there may be a situation in which a brake operation amount acquired from the output information of brake operation unit 14 of vehicle control apparatus 10 indicates a value indicating a brake request given by the vehicle user. In this situation, if vehicle velocity control unit 102 predicts that the change by the deceleration of lead vehicle 1 based on the brake operation in accordance with the normal deceleration command will be greater than the change by the deceleration of lead vehicle 1 based on the brake operation in accordance with the forced deceleration command, vehicle velocity control unit 102 outputs the normal deceleration command to brake apparatus 16 as a control command. In contrast, if vehicle velocity control unit 102 predicts that the change by the deceleration of lead vehicle 1 based on the brake operation in accordance with the normal deceleration command will be less than the change by the deceleration of lead vehicle 1 based on the brake operation in accordance with the forced deceleration command, vehicle velocity control unit 102 continues to output the forced deceleration command to the brake apparatus 16 as a control command.

The prediction of whether the change by the deceleration based on the brake operation in accordance with the normal deceleration command will be greater than the change by the deceleration based on the brake operation in accordance with the forced deceleration command can be performed as follows. For example, vehicle velocity control unit 102 can predict which one of the changes will be greater by comparing the brake operation amount that outputs the forced deceleration command with the brake operation amount acquired from the output information of brake operation unit 14.

If vehicle velocity control unit 102 determines that the change by the deceleration based on the brake operation in accordance with the forced deceleration command is the same as the change by the deceleration based on the brake operation in accordance with the normal deceleration command, vehicle velocity control unit 102 may output either the forced deceleration command or the normal deceleration command as a control command.

Main Part of Control Processing Performed by the Following Vehicle

Figure 7:
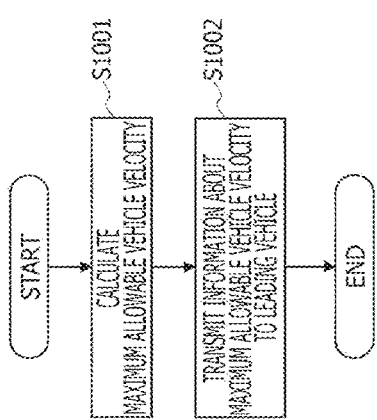
FIG. 7 is a flowchart illustrating an example of a main part of control processing performed by a following vehicle.

FIG. 7 illustrates a part of an example of processing that realizes maximum allowable vehicle velocity calculation unit 202 of the vehicle control apparatus of a following vehicle, the processing being included in the control processing repeatedly performed when the ignition switch of the following vehicle is turned on.

In step S1001 (which is abbreviated "S1001" in FIG. 7, and the same abbreviation will also apply to the following flowcharts), vehicle control apparatus 20 of following vehicle 2 calculates maximum allowable vehicle velocity $V2_{max}$ that satisfies the turning performance of following vehicle 2. Specific methods for calculating maximum allowable vehicle velocity $V2_{max}$ have already been described in the above description of the adaptive cruise control system of following vehicle 2 and another example thereof.

In step S1002, vehicle control apparatus 20 of following vehicle 2 instructs second transmission apparatus 25 to transmit information about calculated maximum allowable vehicle velocity $V2_{max}$ to lead vehicle 1.

Main Part of Control Processing Performed by the Lead Vehicle

Figure 8:
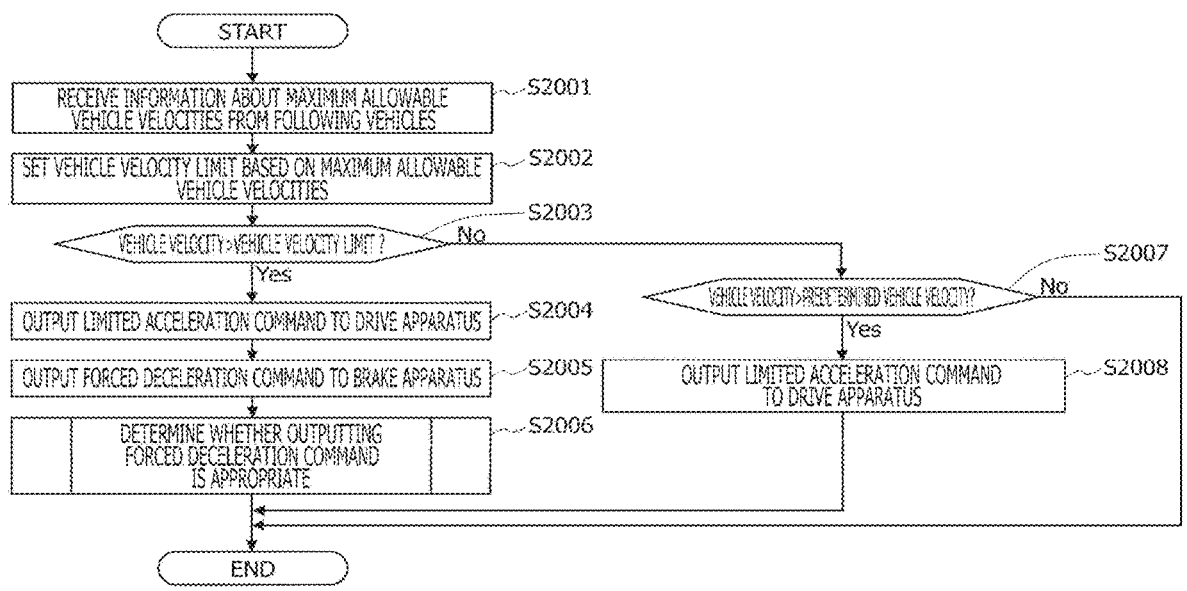
FIG. 8 is a flowchart illustrating an example of a main part of control processing performed by the lead vehicle.

FIG. 8 illustrates a part of an example of processing that realizes vehicle velocity limit setting unit 101 and vehicle velocity control unit 102 of the vehicle control apparatus of a lead vehicle, the processing being included in the control processing repeatedly performed when the ignition switch of the lead vehicle is turned on.

In step S2001, vehicle control apparatus 10 of lead vehicle 1 instructs reception apparatus 12 to receive information about maximum allowable vehicle velocities $V2_{max}(1)$ to $V2_{max}(n)$ (n is a natural number) from following vehicles 2.

In step S2002, vehicle control apparatus 10 of lead vehicle 1 sets vehicle velocity limit $V1_{max}$ based on maximum allowable vehicle velocities $V2_{max}(1)$ to $V2_{max}(n)$ (n is a natural number) of following vehicles 2 acquired from the output information of reception apparatus 12.

In step S2003, vehicle control apparatus 10 of lead vehicle 1 determines whether vehicle velocity V1 is greater than vehicle velocity limit $V1_{max}$. If vehicle control apparatus 10 of lead vehicle 1 determines that vehicle velocity V1 is greater than vehicle velocity limit $V1_{max}$ (YES in step S2003), the processing proceeds to step S2004. However, if vehicle control apparatus 10 of lead vehicle 1 determines that vehicle velocity V1 is less than or equal to vehicle velocity limit $V1_{max}$ (NO in step S2003), the processing proceeds to step S2007.

In step S2004, vehicle control apparatus 10 of lead vehicle 1 outputs a limited acceleration command to drive apparatus 15. As described above, the limited acceleration command is generated based on a corrected acceleration operation amount obtained by reducing the acceleration operation amount associated with the acceleration request from the vehicle user to a value that does not substantially accelerate lead vehicle 1.

In step S2005, vehicle control apparatus 10 of lead vehicle 1 outputs a forced deceleration command to brake apparatus 16. In step S2006, vehicle control apparatus 10 of lead vehicle 1 determines whether outputting the forced deceleration command is appropriate. A specific processing content of this determination of whether outputting the forced deceleration command is appropriate will be described below.

In step S2007, vehicle control apparatus 10 of lead vehicle 1 determines whether vehicle velocity V1 is greater than predetermined vehicle velocity V1d. If vehicle control apparatus 10 of lead vehicle 1 determines that vehicle velocity V1 is greater than predetermined vehicle velocity V1d (YES in step S2007), the processing proceeds to step S2008. However, if vehicle control apparatus 10 of lead vehicle 1 determines that vehicle velocity V1 is less than or equal to predetermined vehicle velocity V1d (NO in step S2007), vehicle control apparatus 10 ends the present control processing without limiting vehicle velocity V1.

In step S2008, vehicle control apparatus 10 of lead vehicle 1 outputs a limited acceleration command to drive apparatus 15. Unlike the limited acceleration command output in step S2004, as described above, the limited acceleration command output in this step is generated based on a corrected acceleration operation amount obtained by reducing the acceleration operation amount associated with the acceleration request from the vehicle user to a value within a range in which lead vehicle 1 can be accelerated.

Determination of Whether Outputting Forced Deceleration Command is Appropriate

Figure 9:
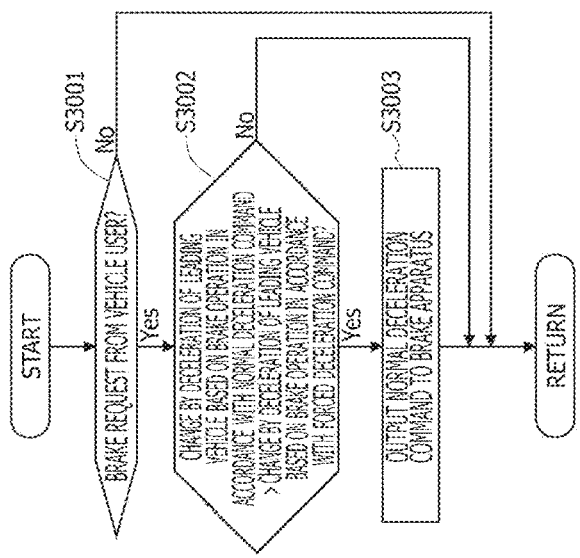
FIG. 9 is a flowchart illustrating an example of a subroutine for determination of whether outputting a forced deceleration command is appropriate.

FIG. 9 is a subroutine illustrating an example of the determination of whether outputting the forced deceleration command is appropriate in step S2006 included in the control processing in FIG. 8 performed by the vehicle control apparatus of the lead vehicle.

In step S3001, vehicle control apparatus 10 of lead vehicle 1 determines whether there is a brake request from the vehicle user. As described above, whether there is a brake request from the vehicle user can be determined based on the value of a brake operation amount acquired from the output information of brake operation unit 14.

In step S3002, vehicle control apparatus 10 of lead vehicle 1 determines whether the change by the deceleration of lead vehicle 1 based on the brake operation in accordance with the normal deceleration command is greater than the change by the deceleration of lead vehicle 1 based on the brake operation in accordance with the forced deceleration command. If vehicle control apparatus 10 of lead vehicle 1 determines that the change by the deceleration of lead vehicle 1 based on the brake operation in accordance with the normal deceleration command is greater than the change by the deceleration of lead vehicle 1 based on the brake operation in accordance with the forced deceleration command (YES in step S3002), vehicle control apparatus 10 determines that outputting the forced deceleration command is not appropriate, and the processing proceeds to step S3003. In contrast, if vehicle control apparatus 10 of lead vehicle 1 determines that the change by the deceleration of lead vehicle 1 based on the brake operation in accordance with the normal deceleration command is not greater than the change by the deceleration of lead vehicle 1 based on the brake operation in accordance with the forced deceleration command (NO in step S3002), vehicle control apparatus 10 determines that outputting of the forced deceleration command is appropriate and ends the present subroutine by skipping step S3003.

In step S3003, vehicle control apparatus 10 of lead vehicle 1 generates the normal deceleration command based on the brake operation amount acquired from the output information of brake operation unit 14 and outputs the normal deceleration command, instead of the forced deceleration command, to brake apparatus 16 as a control command.

As described above, in the adaptive cruise control system according to the first example, each following vehicle 2 calculates its maximum allowable vehicle velocity $V2_{max}$ that satisfies its turning performance, and lead vehicle 1 calculates vehicle velocity limit $V1_{max}$ based on maximum allowable vehicle velocities $V2_{max}$ transmitted from following vehicles 2 and performs vehicle velocity control such that vehicle velocity V1 will not exceed vehicle velocity limit $V1_{max}$. In this way, following vehicle 2 running on a curve is prevented from experiencing excessively large lateral acceleration that causes at least one of deteriorated ride quality, slipping, and freight collapsing.

Second Example

Outline of Adaptive Cruise Control System

Hereinafter, an outline of an adaptive cruise control system according to a second example will be described with reference to FIG. 10. The present example will focus on the difference from the first example. The same components in the first and second examples will be denoted by the same reference numerals, and description thereof will be omitted or simplified.

Figure 10:
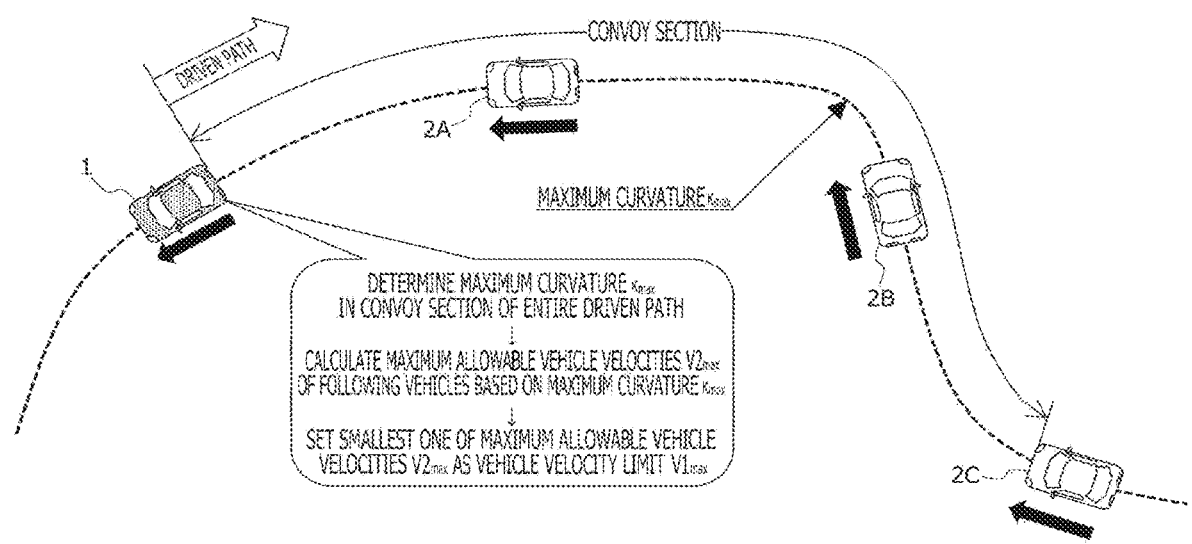
FIG. 10 is a schematic diagram illustrating an outline of an adaptive cruise control system according to a second example.

FIG. 10 illustrates an example of the driving state of a convoy including three following vehicles in the adaptive cruise control system. In FIG. 10, first following vehicle 2A, second following vehicle 2B, and third following vehicle 2C are non-mechanically connected to lead vehicle 1 sequentially, and each of following vehicles 2A to 2C follows its immediately preceding vehicle. In the above adaptive cruise control system, each of the following vehicles 2A to 2C calculates its maximum allowable vehicle velocity $V2_{max}$ that satisfies its turning performance on its driving path on which the corresponding following vehicle is actually running or is about to run. However, in the present example, lead vehicle 1 calculates, for the following vehicles, maximum allowable vehicle velocities $V2_{max}$ that satisfy their respective turning performances on the driving path in the convoy section from lead vehicle 1 to third following vehicle 2C, of the entire driving path that lead vehicle 1 has already passed (driven path).

Specifically, lead vehicle 1 calculates the curvature of the driving path on which lead vehicle 1 is running while sequentially storing the curvature and determines a maximum curvature $\kappa_{max}$ on the driving path in the convoy section of the entire driven path. Next, lead vehicle 1 calculates maximum allowable vehicle velocity $V2_{max}$ for each of the following vehicles based on maximum curvature $\kappa_{max}$ and the turning performances of following vehicles 2A to 2C. Next, lead vehicle 1 sets the lowest one of calculated maximum allowable vehicle velocities $V2_{max}$ of following vehicles 2A to 2C as vehicle velocity limit $V1_{max}$ and performs vehicle velocity control such that the vehicle velocity will not exceed vehicle velocity limit $V1_{max}$. Although not illustrated, when only one following vehicle 2A follows lead vehicle 1, lead vehicle 1 sets maximum allowable vehicle velocity $V2_{max}$ calculated based on maximum curvature $\kappa_{max}1$ and the turning performance of following vehicle 2A as vehicle velocity limit $V1_{max}$.

Adaptive Cruise Control System of the Following Vehicle

Figure 11:
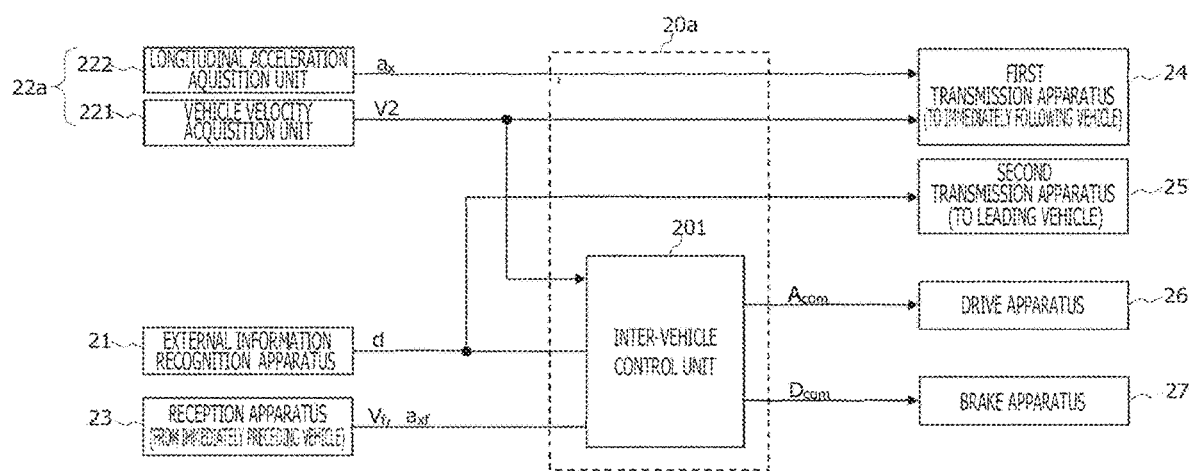
FIG. 11 is a functional block diagram illustrating an example of an adaptive cruise control system of a following vehicle.

FIG. 11 illustrates an example of an adaptive cruise control system mounted on a following vehicle. The adaptive cruise control system mounted on following vehicle 2 includes a vehicle control apparatus 20a as a main component, external information recognition apparatus 21, a vehicle state acquisition apparatus 22a, reception apparatus 23, first transmission apparatus 24, second transmission apparatus 25, drive apparatus 26, and brake apparatus 27.

While vehicle control apparatus 20a includes a microcomputer as a control unit and inter-vehicle control unit 201 described above as a main function, vehicle control apparatus 20a does not include maximum allowable vehicle velocity calculation unit 202. In addition, vehicle control apparatus 20a instructs second transmission apparatus 25 to transmit, instead of information about maximum allowable vehicle velocity $V2_{max}$, information about inter-vehicle distance d output from external information recognition apparatus 21 to lead vehicle 1.

While vehicle state acquisition apparatus 22a includes longitudinal acceleration acquisition unit 222 and vehicle velocity acquisition unit 221 necessary for vehicle velocity control, vehicle state acquisition apparatus 22a does not include yaw rate acquisition unit 223, lateral acceleration acquisition unit 224, and steering angle acquisition unit 225 necessary for calculating maximum allowable vehicle velocity $V2_{max}$.

Adaptive Cruise Control System of the Lead Vehicle

Figure 12:
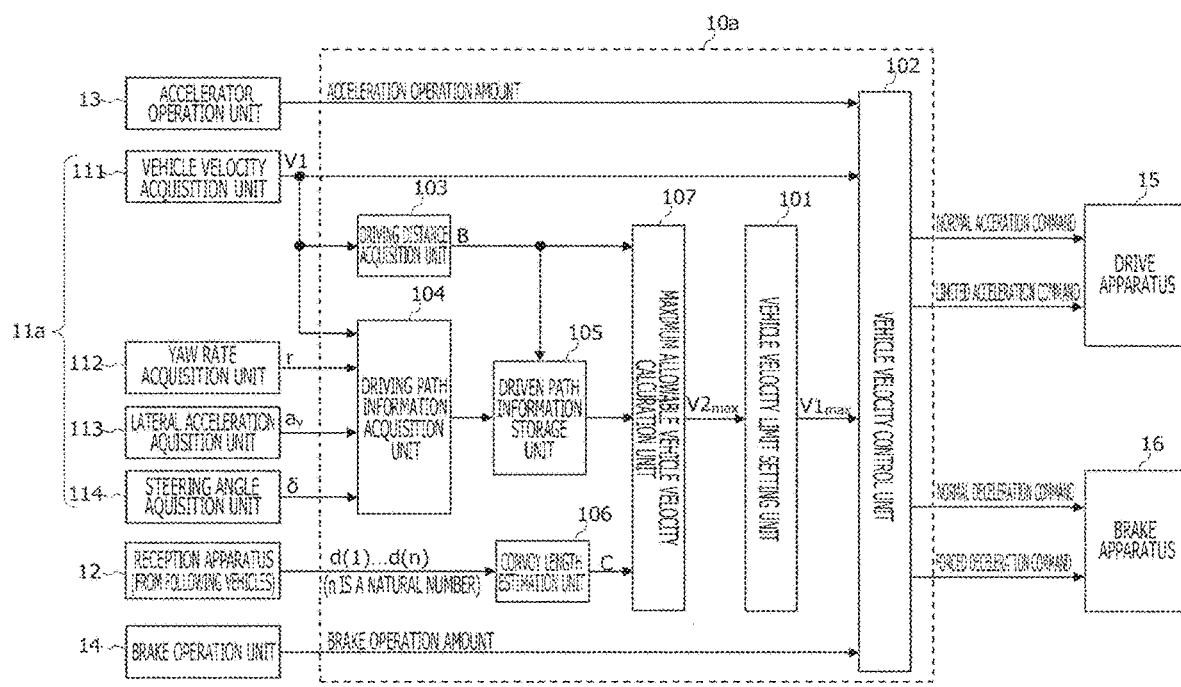
FIG. 12 is a functional block diagram illustrating an example of an adaptive cruise control system of a lead vehicle.

FIG. 12 illustrates an example of an adaptive cruise control system mounted on the lead vehicle. The adaptive cruise control system mounted on lead vehicle 1 includes a vehicle control apparatus 10a as a main component including a microcomputer as a control unit. The adaptive cruise control system also includes a vehicle state acquisition apparatus 11a, reception apparatus 12, accelerator operation unit 13, brake operation unit 14, drive apparatus 15, and brake apparatus 16. In addition to vehicle velocity acquisition unit 111, vehicle state acquisition apparatus 11a includes a yaw rate acquisition unit 112, a lateral acceleration acquisition unit 113, and a steering angle acquisition unit 114.

Because yaw rate acquisition unit 112, lateral acceleration acquisition unit 113, and steering angle acquisition unit 114 are configured in the same way as yaw rate acquisition unit 223, lateral acceleration acquisition unit 224, and steering angle acquisition unit 225 of following vehicle 2 according to the first example, description thereof will be omitted.

The microcomputer of vehicle control apparatus 10a receives various kinds of information output from vehicle state acquisition apparatus 11a, reception apparatus 12, accelerator operation unit 13, and brake operation unit 14 and outputs calculation results obtained based on various kinds of information to drive apparatus 15 and brake apparatus 16 as control commands.

In addition to the two main functions which vehicle velocity limit setting unit 101 and vehicle velocity control unit 102 have as described above, vehicle control apparatus 10a has another main function of acquiring information necessary for setting vehicle velocity limit $V1_{max}$. This function is realized by five units of a driving distance acquisition unit 103, a driving path information acquisition unit 104, a driven path information storage unit 105, a convoy length estimation unit 106, and a maximum allowable vehicle velocity calculation unit 107.

Driving distance acquisition unit 103 acquires vehicle velocity V1 from the output information of vehicle velocity acquisition unit 111 and acquires driving distance B of lead vehicle 1 based on vehicle velocity V1. For example, driving distance B of lead vehicle 1 can be acquired by multiplying vehicle velocity V1 acquired per control cycle of the microcomputer of vehicle control apparatus 10a by control cycle time and by adding up the calculated products.

Driving path information acquisition unit 104 acquires physical amounts indicating the vehicle state at an actual driving location of lead vehicle 1 from the output information of vehicle state acquisition apparatus 11a and acquires, based on these physical amounts, information about the shape of the driving path at the actual driving location of lead vehicle 1 (driving path information).

Examples of the driving path information include a curvature κ1 of the driving path at the driving location of lead vehicle 1. Curvature κ1 is calculated by suitably assigning vehicle velocity V1, lateral acceleration $a_y$, yaw rate r, and steering angle δ to any one of various relational expressions indicating basic motion characteristics of lead vehicle 1. Because these various relational expressions indicating basic motion characteristics of lead vehicle 1 are the same as those used for calculating curvature κ2 of the driving path on which following vehicle 2 is running according to the first example, description thereof will be omitted. Regarding various relational expressions that lead vehicle 1 uses to calculate curvature κ1, a suitable relational expression may be selected depending on which acquisition units are included in vehicle state acquisition apparatus 11a of lead vehicle 1.

For example, there are cases in which there is only one following vehicle 2, the convoy section is relatively short, or lead vehicle 1 has run at a constant velocity on the driving path in the convoy section. In any one of these cases, it can be assumed that the vehicle velocity of lead vehicle 1 has not changed much from the location of following vehicle 2 at the end of the convoy to the location of lead vehicle 1 and that the vehicle velocity of lead vehicle 1 has been constant on the driving path in the convoy section. Thus, in these cases, it is reasonable to say that the individual values of the yaw rate, the lateral acceleration, and the steering angle acquired on the driving path in the convoy section indirectly indicate curvature κ1 on the driving path in the convoy section. Thus, when the vehicle velocity of lead vehicle 1 can be regarded as being constant on the driving path in the convoy section, yaw rate r or lateral acceleration $a_y$ acquired by vehicle state acquisition unit 11a may be acquired as the driving path information, instead of curvature κ1.

Each time that driven path information storage unit 105 acquires driving distance B and driving path information, driven path information storage unit 105 associates driving distance B with the driving path information and stores the associated information as driven path information in the volatile memory or the like of the microcomputer. The driven path information is information about the shape of the driving path on which lead vehicle 1 has already run.

Convoy length estimation unit 106 estimates a convoy length C corresponding to the length of the convoy section based on inter-vehicle distances d(1) to d(n) (n is a natural number) acquired from the output information of reception apparatus 12. As described above, n is a natural number for indicating identification numbers of following vehicles 2. Specifically, while convoy length estimation unit 106 estimates convoy length C based on a sum of inter-vehicle distances d(1) to d(n) (n is a natural number), if the vehicle length of following vehicle 2 is known, this vehicle length may be added to convoy length C.

Maximum allowable vehicle velocity calculation unit 107 sets maximum allowable vehicle velocity $V2_{max}$ as follows, based on driving distance B acquired by driving distance acquisition unit 103, the driven path information stored in driven path information storage unit 105, and convoy length C estimated by convoy length estimation unit 106.

First, maximum allowable vehicle velocity calculation unit 107 subtracts convoy length C from driving distance B of lead vehicle 1 and determines a driving distance $B_{end}$ of lead vehicle 1, driving distance $B_{end}$ corresponding to the driving location of the last vehicle in the convoy. Next, maximum allowable vehicle velocity calculation unit 107 refers to the driven path information and determines maximum curvature $\kappa_{max}$ on the driving path in the convoy section from curvatures κ1 from driving distance B to driving distance $B_{end}$. To save memory resources, of all the driven path information stored in the volatile memory or the like, driven path information less than driving distance $B_{end}$ may be deleted.

Next, maximum allowable vehicle velocity calculation unit 107 calculates maximum allowable vehicle velocity $V2_{max}$ for each of following vehicles 2 based on maximum curvature $\kappa_{max}$ and the turning performance of corresponding following vehicles 2. Maximum allowable vehicle velocity calculation unit 107 may calculate maximum allowable vehicle velocity $V2_{max}$ by replacing curvature κ2 in mathematical equation (2) or mathematical equation (3) by maximum curvature $\kappa_{max}$. That is, maximum allowable vehicle velocity calculation unit 107 may calculate maximum allowable vehicle velocity $V2_{max}$ as the square root of a value obtained by dividing lateral acceleration limit $a_{ylim}$ by maximum curvature $\kappa_{max}$ or a value obtained by dividing yaw rate limit $r_{lim}$ by maximum curvature $\kappa_{max}$. If a plurality of following vehicles 2 have the same turning performance, maximum allowable vehicle velocity calculation unit 107 may calculate maximum allowable vehicle velocity $V2_{max}$ for only one following vehicle 2, without calculating maximum allowable vehicle velocity $V2_{max}$ for each following vehicle 2.

If driving path information acquisition unit 104 has acquired yaw rate r or lateral acceleration $a_y$ as the driving path information, maximum allowable vehicle velocity calculation unit 107 refers to the driven path information and determines the maximum value of yaw rate r or lateral acceleration $a_y$ on the driving path in the convoy section. This is because it is conceivable, when yaw rate r or lateral acceleration $a_y$ on the driving path in the convoy section reaches its maximum value, the curvature on the driving path in the convoy section reaches maximum curvature $\kappa_{max}$. Next, maximum allowable vehicle velocity calculation unit 107 assigns the maximum value of yaw rate r to mathematical equation (4) or the maximum value of lateral acceleration $a_y$ to mathematical equation (5), to calculate maximum allowable vehicle velocity $V2_{max}$ for each following vehicle 2.

Vehicle velocity limit setting unit 101 sets vehicle velocity limit $V1_{max}$ based on maximum allowable vehicle velocities $V2_{max}(1)$ to $V2_{max}(n)$ (n is a natural number) of following vehicles 2 calculated by maximum allowable vehicle velocity calculation unit 107. Specifically, if there is only one following vehicle 2, vehicle velocity limit setting unit 101 sets maximum allowable vehicle velocity $V2_{max}(1)$ as vehicle velocity limit $V1_{max}$. If there are a plurality of following vehicles 2, vehicle velocity limit setting unit 101 sets the lowest one of maximum allowable vehicle velocities $V2_{max}(1)$ to $V2_{max}(n)$ (n is a natural number of 2 or greater) as vehicle velocity limit $V1_{max}$.

Vehicle velocity control unit 102 acquires vehicle velocity V1, the acceleration operation amount, and the brake operation amount from the output information of vehicle velocity acquisition unit 111, accelerator operation unit 13, and brake operation unit 14 and outputs control commands generated based on the acceleration operation amount, vehicle velocity V1, vehicle velocity limit $V1_{max}$, and the brake operation amount to drive apparatus 15 and brake apparatus 16. Vehicle velocity control unit 102 performs vehicle velocity control in this way. Since other specific contents about vehicle velocity control unit 102 are the same as those according to the first example, description thereof will be omitted.

Main Part of Control Processing Performed by the Following Vehicle

Figure 13:
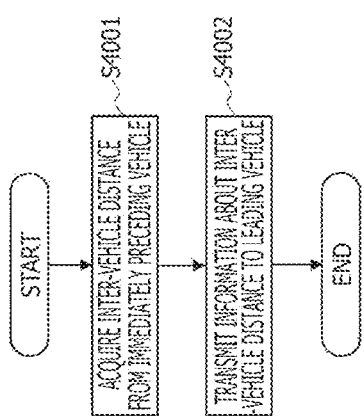
FIG. 13 is a flowchart illustrating an example of a main part of control processing performed by a following vehicle.

FIG. 13 illustrates a part of an example of a main part of the control processing repeatedly performed by the vehicle control apparatus of a following vehicle when the ignition switch of the following vehicle is turned on. The processing that realizes inter-vehicle control unit 201, the processing being included in the main part, is not included in this example.

In step S4001, vehicle control apparatus 20*a* of following vehicle 2 acquires inter-vehicle distance d from its immediately preceding vehicle from the output information of external information recognition apparatus 21.

In step S4002, vehicle control apparatus 20*a* of following vehicle 2 instructs second transmission apparatus 25 to transmit information about inter-vehicle distance d to lead vehicle 1.

Main Part of Control Processing Performed by the Lead Vehicle

Figure 14:
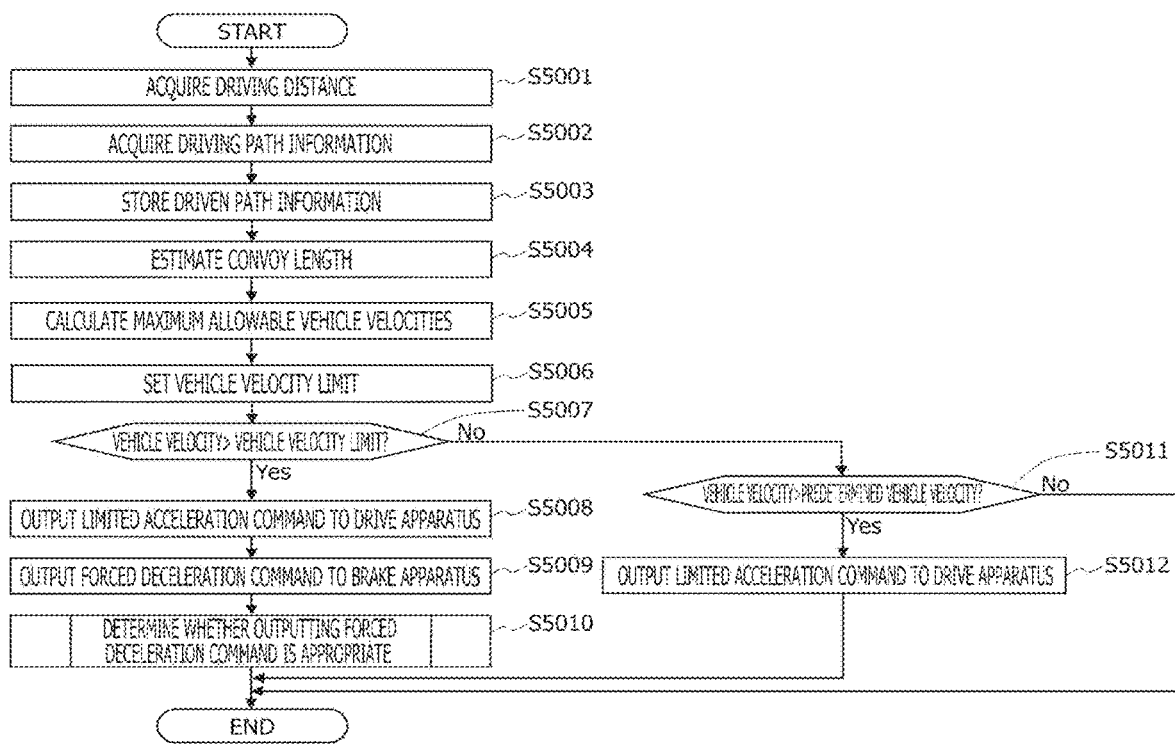
FIG. 14 is a flowchart illustrating an example of a main part of control processing performed by the lead vehicle.

FIG. 14 illustrates a part of an example of processing that realizes the above main functions of all the control processing repeatedly performed by the vehicle control apparatus of a lead vehicle when the ignition switch of the lead vehicle is turned on.

In step S5001, vehicle control apparatus 10*a* of lead vehicle 1 acquires vehicle velocity V1 from the output information of vehicle velocity acquisition unit 111 and calculates driving distance B based on vehicle velocity V1.

In step S5002, vehicle control apparatus 10*a* of lead vehicle 1 acquires physical amounts indicating the vehicle state at its actual driving location from the output information of vehicle state acquisition apparatus 11*a* and acquires driving path information (for example, curvature κ1) from the physical amounts. Step S5002 may be performed before step S5001.

In step S5003, vehicle control apparatus 10*a* of lead vehicle 1 associates the driving path information acquired in step S5002 with driving distance B acquired in step S5001 and stores the associated information in the volatile memory or the like of the microcomputer as driven path information.

In step S5004, vehicle control apparatus 10*a* of lead vehicle 1 estimates convoy length C based on inter-vehicle distances d(1) to d(n) (n is a natural number) acquired from the output information of reception apparatus 12. Step S5004 may be performed before step S5003.

In step S5005, vehicle control apparatus 10*a* of lead vehicle 1 calculates maximum allowable vehicle velocities $V2_{max}$ based on driving distance B acquired in step S5001, convoy length C estimated in step S5002, and driven path information stored in step S5003. Since specific methods for calculating maximum allowable vehicle velocity $V2_{max}$ are the same are those described with maximum allowable vehicle velocity calculation unit 107, description thereof will be omitted.

In step S5006, vehicle control apparatus 10*a* of lead vehicle 1 sets vehicle velocity limit $V1_{max}$ based on maximum allowable vehicle velocities $V2_{max}(1)$ to $V2_{max}(n)$ (n is a natural number) of following vehicles 2 calculated in step S5005. Since steps S5007 to S5012 are the same as steps S2003 to S2008, description thereof will be omitted.

As described above, while each following vehicle 2 measures inter-vehicle distance d from its immediately preceding vehicle so that lead vehicle 1 can estimate convoy length C, inter-vehicle distance d may be measured in a different way. For example, if there is only one following vehicle 2, lead vehicle 1 can measure inter-vehicle distance d from following vehicle 2 by using a rear side recognition apparatus that can recognize objects behind lead vehicle 1. In this way, following vehicle 2 does not need to transmit information about inter-vehicle distance d to lead vehicle 1. If there are a plurality of following vehicles 2, in addition to have lead vehicle 1 measure inter-vehicle distance d from the vehicle immediately following lead vehicle 1 by using a rear side recognition apparatus, each following vehicle 2 may measure inter-vehicle distance d from the vehicle immediately following this following vehicle 2 by using a rear side recognition apparatus equivalent to that of lead vehicle 1. In this way, the last vehicle in the convoy does not need to transmit information about inter-vehicle distance d to lead vehicle 1.

When the target value of the inter-vehicle distance in the inter-vehicle control unit of following vehicle 2 is a constant value and when actual convoy length C will not probably change by the inter-vehicle control, vehicle control apparatus 10*a* of lead vehicle 1 may be configured without convoy length estimation unit 106. In this case, maximum allowable vehicle velocity calculation unit 107 of vehicle control apparatus 10*a* of lead vehicle 1 calculates maximum allowable vehicle velocity $V2_{max}$ assuming that convoy length C is a known fixed value stored in advance in the non-volatile memory or the like of the microcomputer.

As described above, in the adaptive cruise control system according to the second example, lead vehicle 1 calculates maximum allowable vehicle velocities $V2_{max}$ based on maximum curvature $\kappa_{max}$ of the driving path in the convoy section in the driven path and the turning performances of following vehicles 2. Next, lead vehicle 1 sets vehicle velocity limit $V1_{max}$ based on maximum allowable vehicle velocities $V2_{max}$ of following vehicles 2 and performs vehicle velocity control such that the vehicle velocity of lead vehicle 1 will not exceed vehicle velocity limit $V1_{max}$. In this way, in addition to preventing following vehicle 2 on a curve from experiencing excessively large lateral acceleration that causes at least one of deteriorated ride quality, slipping, and freight collapsing, the following significant advantageous effects can be provided. That is, following vehicles 2 do not need to calculate maximum allowable vehicle velocities $V2_{max}$. In addition, when the convoy length will not probably change, each following vehicle 2 does not need transmit information about inter-vehicle distance d. Thus, since following vehicle 2 has less processing load, calculation resources can be allocated to other control processing such inter-vehicle control processing.

As describe above, in FIG. 12, maximum allowable vehicle velocity calculation unit 107 calculates maximum allowable vehicle velocities $V2_{max}$ of following vehicles 2 and supplies calculated maximum allowable vehicle velocities $V2_{max}$ to vehicle velocity limit setting unit 101, which then calculates vehicle velocity limit $V1_{max}$. However, alternatively, vehicle velocity limit $V1_{max}$ may directly be determined based on the driven path information stored in driven path information storage unit 105.

Although the present invention has thus been described in detail with reference to preferable examples, the individual technical concepts described in the above first and second examples can be appropriately combined and used as long as there is no conflict. In addition, it is apparent to those skilled in the art that various types of modifications, as described below, are possible, based on the basic technical concept and teaching of the present invention.

In the above first and second examples, lead vehicle 1 sets vehicle velocity limit $V1_{max}$ based on maximum allowable vehicle velocities $V2_{max}$ of following vehicles 2 and performs vehicle velocity control such that the vehicle velocity of lead vehicle 1 will not exceed vehicle velocity limit $V1_{max}$. Alternatively, lead vehicle 1 may simply perform vehicle velocity control such that lead vehicle 1 does not accelerate when following vehicle 2 enters a curve. For example, when following vehicle 2 determines that following vehicle 2 has entered a curve based on the output information of yaw rate acquisition unit 223, lateral acceleration acquisition unit 224, or steering angle acquisition unit 225, following vehicle 2 transmits a limitation request signal requesting lead vehicle 1 to limit the vehicle velocity of lead vehicle 1. Upon receiving this limitation request signal, lead vehicle 1 performs vehicle velocity control that prevents acceleration of lead vehicle 1. In this way, it is possible to reduce the risk that following vehicle 2 on a curve will experience excessively large lateral acceleration that causes at least one of deteriorated ride quality, slipping, and freight collapsing.

In the above first and second examples, the processing for determining whether outputting the forced deceleration command is appropriate is performed in a predetermined step in the control processing of lead vehicle 1. However, alternatively, this determination processing may be performed as interrupt processing performed when a brake request is issued from the vehicle user while the forced deceleration command is being output.

In each of the above adaptive cruise control systems of following vehicles 2, for convenience of description of the functions, three functions that perform inter-vehicle communication have been described. However, reception apparatus 23, first transmission apparatus 24, and second transmission apparatus 25 may be configured as a single communication apparatus.

In each of the above adaptive cruise control systems of lead vehicles 1, vehicle velocity control unit 102 selects the normal acceleration command or the limited acceleration command and selects the normal deceleration command or the forced deceleration command. However, the drive controller of drive apparatus 15 may select the normal acceleration command from accelerator operation unit 13 or the limited acceleration command from vehicle velocity control unit 102, and the brake controller of brake apparatus 16 may select the normal deceleration command from brake operation unit 14 or the forced deceleration command from vehicle velocity control unit 102.

REFERENCE SYMBOL LIST

1 lead vehicle
10, 10a vehicle control apparatus
12 reception apparatus
13 accelerator operation unit
14 brake operation unit
15 drive apparatus
16 brake apparatus
101 vehicle velocity limit setting unit
102 vehicle velocity control unit
103 driving distance acquisition unit
104 driving path information acquisition unit
105 driven path information storage unit
106 convoy length estimation unit
107 maximum allowable vehicle velocity calculation unit
111 vehicle velocity acquisition unit
112 yaw rate acquisition unit
113 lateral acceleration acquisition unit
114 steering angle acquisition unit
2, 2A, 2B, 2C following vehicle
20, 20a vehicle control apparatus
21 external information recognition apparatus
25 second transmission apparatus
202 maximum allowable vehicle velocity calculation unit
221 vehicle velocity acquisition unit
223 yaw rate acquisition unit
224 lateral acceleration acquisition unit
225 steering angle acquisition unit
$a_y$ lateral acceleration
$a_{ylim}$ lateral acceleration limit
r yaw rate
$r_{lim}$ yaw rate limit
V1 vehicle velocity of lead vehicle
V1d predetermined vehicle velocity
$V1_{max}$ vehicle velocity limit
$V2_{max}$ maximum allowable vehicle velocity of following vehicle
$\kappa 1$ curvature at driving location of lead vehicle
$\kappa_{max}$ maximum curvature of driving path in convoy section
$\kappa 2$ curvature at driving location of following vehicle
$\kappa 2_{est}$ forward curvature of following vehicle

The invention claimed is:

1. A vehicle control apparatus comprising:
a control unit which is mounted on a lead vehicle in an adaptive cruise control system that non-mechanically connects at least one following vehicle to the lead vehicle sequentially and that causes the at least one following vehicle to follow the lead vehicle, wherein the control unit sequentially stores a data of a driving location of the lead vehicle in association with a curvature of a driving path at the driving location, wherein the control unit estimates, based on a sum of each inter-vehicle distance in a convoy of the lead vehicle and the at least one vehicle, a convoy length from the lead vehicle to a last vehicle in the convoy, and determines, based on the stored data and the estimated convoy length, a maximum curvature of a driven path from the lead vehicle to the last vehicle, of an entire driven path that the lead vehicle has already passed, wherein the control unit calculates a maximum allowable vehicle velocity for each of the at least one following vehicle based on an allowable upper limit of a lateral acceleration or an allowable upper limit of a yaw rate, which is predetermined for each of the at least one following vehicle and the determined maximum curvature, wherein when the at least one following vehicle is only one following vehicle, the control unit sets, as a vehicle velocity limit for limiting a velocity of the lead vehicle, the maximum allowable vehicle velocity of the only one following vehicle, wherein when the at least one following vehicle is a plurality of following vehicles, the control unit sets, as the vehicle velocity limit, a lowest one of the maximum allowable vehicle velocities of the plurality of following vehicles, and wherein the control unit outputs a control command to a brake apparatus and/or a drive apparatus such that the velocity of the lead vehicle does not exceed the vehicle velocity limit.

2. The vehicle control apparatus according to claim 1, wherein, when the velocity of the lead vehicle exceeds a predetermined vehicle velocity lower than the vehicle velocity limit, the control unit outputs a limited acceleration command for limiting acceleration of the lead vehicle to the drive apparatus as the control command.

3. The vehicle control apparatus according to claim 1, wherein when the velocity of the lead vehicle is higher than the vehicle velocity limit, the control unit outputs a forced deceleration command for forcibly decelerating the lead vehicle to the brake apparatus as the control command.

4. The vehicle control apparatus according to claim 3, wherein, when a brake operation amount associated with a brake request from a vehicle user is input while the forced deceleration command is being output, if the control unit determines that change by deceleration of the lead vehicle by a brake operation in accordance with the brake request from the vehicle user is greater than change by deceleration of the lead vehicle by a brake operation in accordance with the forced deceleration command, the control unit outputs a driver deceleration command generated based on the brake operation amount to the brake apparatus as the control command.

5. The vehicle control apparatus according to claim 1, wherein the at least one following vehicle is a plurality of following vehicles.

6. A vehicle control method for a lead vehicle in an adaptive cruise control system that non-mechanically connects at least one following vehicle to the lead vehicle sequentially and that causes the at least one following vehicle to follow the lead vehicle, the vehicle control method comprising: sequentially storing a data of a driving location of the lead vehicle in association with a curvature of a driving path at the driving location; estimating, based on a sum of each inter-vehicle distance in a convoy of the lead vehicle and the at least one vehicle, a convoy length from the lead vehicle to a last vehicle in the convoy; determining, based on the stored data and the estimated convoy length, a maximum curvature of a driven path from the lead vehicle to the last vehicle, of an entire driven path that the lead vehicle has already passed; calculating a maximum allowable vehicle velocity for each of the at least one following vehicle based on an allowable upper limit of a lateral acceleration or an allowable upper limit of a yaw rate which is predetermined for each of the at least one following vehicle and the determined maximum curvature; when the at least one following vehicle is only one following vehicle, setting, as a vehicle velocity limit for limiting a velocity of the lead vehicle, the maximum allowable vehicle velocity of the only one following vehicle; when the at least one following vehicle is a plurality of following vehicles, setting, as the vehicle velocity limit, a lowest one of the maximum allowable vehicle velocities of the plurality of following vehicles; and controlling a brake apparatus and/or a drive apparatus such that the velocity of the lead vehicle will not exceed the vehicle velocity limit.

7. An adaptive cruise control system that non-mechanically connects at least one following vehicle to a lead vehicle sequentially and that causes the at least one following vehicle to follow the lead vehicle, wherein the lead vehicle comprises:

a control unit that sequentially stores a data of a driving location of the lead vehicle in association with a curvature of a driving path at the driving location, and that estimates, based on a sum of each inter-vehicle distance in a convoy of the lead vehicle and the at least one vehicle, a convoy length from the lead vehicle to a last vehicle in the convoy, and determines, based on the stored data and the estimated convoy length, a maximum curvature of a driven path from the lead vehicle to the last vehicle, of an entire driven path that the lead vehicle has already passed, and that calculates a maximum allowable vehicle velocity for each of the at least one following vehicle based on an allowable upper limit of a lateral acceleration or an allowable upper limit of a yaw rate which is predetermined for each of the at least one following vehicle and the determined maximum curvature, and that when the at least one following vehicle is only one following vehicle, the control unit sets, as a vehicle velocity limit for limiting a velocity of the lead vehicle, the maximum allowable vehicle velocity of the only one following vehicle, and that when the at least one following vehicle is a plurality of following vehicles, the control unit sets, as the vehicle velocity limit, a lowest one of the maximum allowable vehicle velocities of the plurality of following vehicles, and that outputs a control command for limiting acceleration or deceleration of the lead vehicle such that the velocity of the lead vehicle will not exceed the vehicle velocity limit;

a brake apparatus that controls braking force based on the control command; and a drive apparatus that controls driving force based on the control command.

* * * * *